Aug. 19, 1958

A. R. WELCH 2,847,701

APPARATUS FOR DEPOSITING OVERLAY
MATERIAL ON PLYWOOD PANELS

Filed May 9, 1952

INVENTOR
ARTHUR R. WELCH

BY Cushman, Darby + Cushman
ATTORNEYS

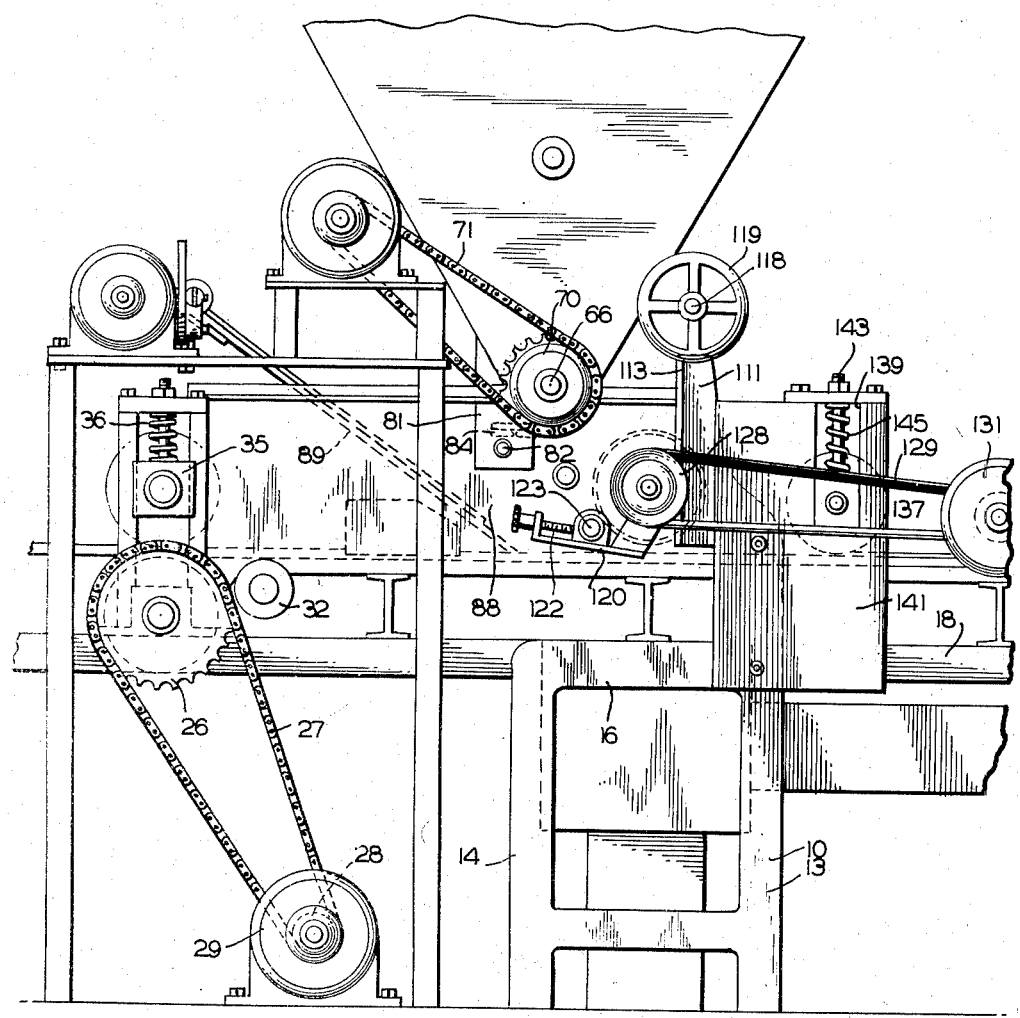
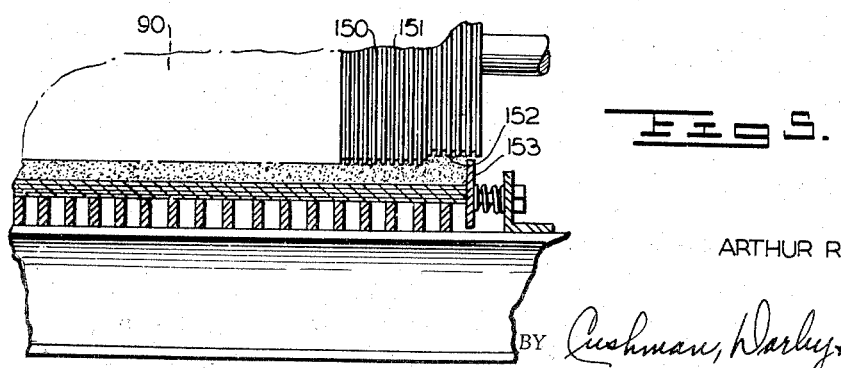

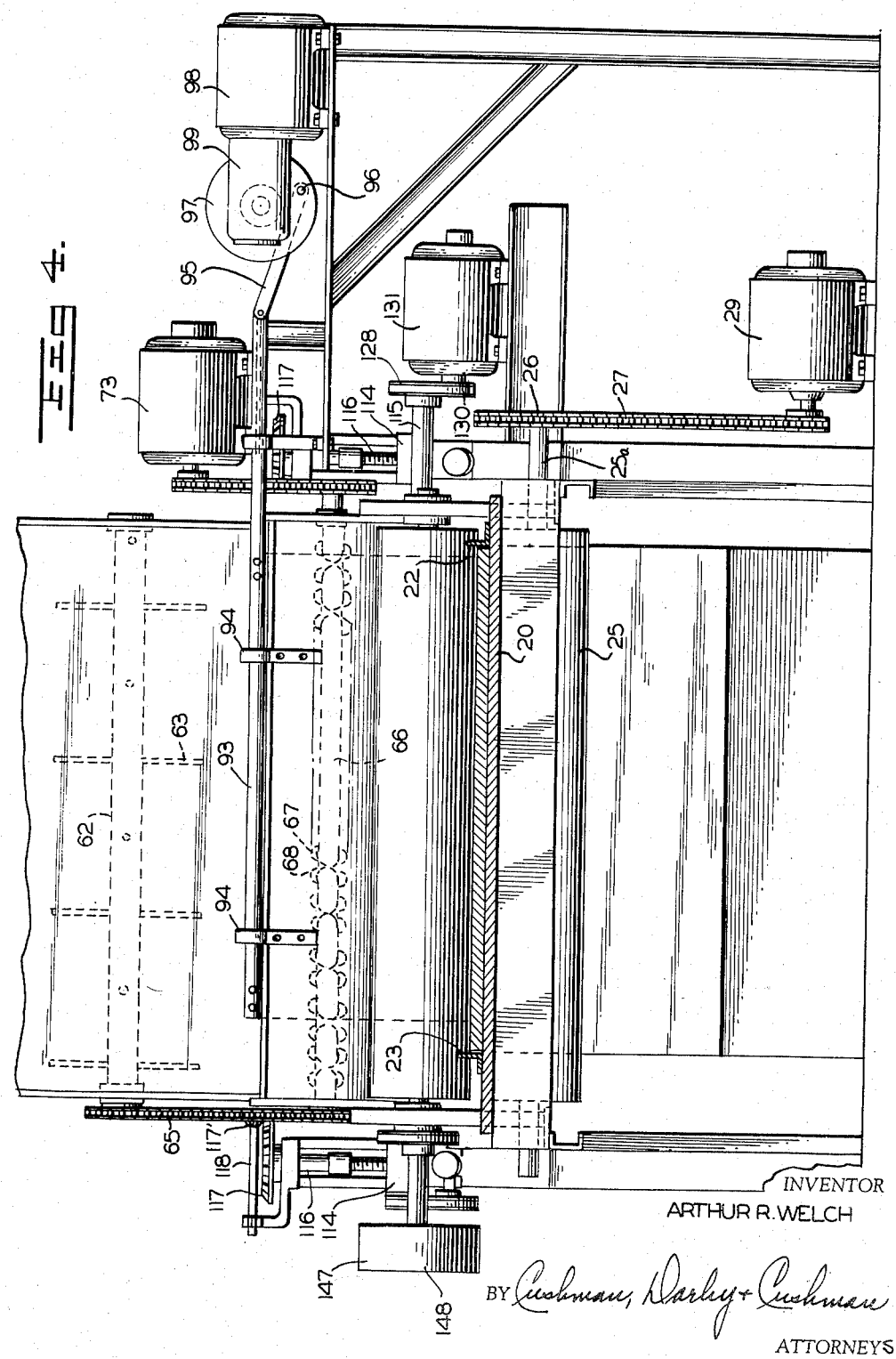

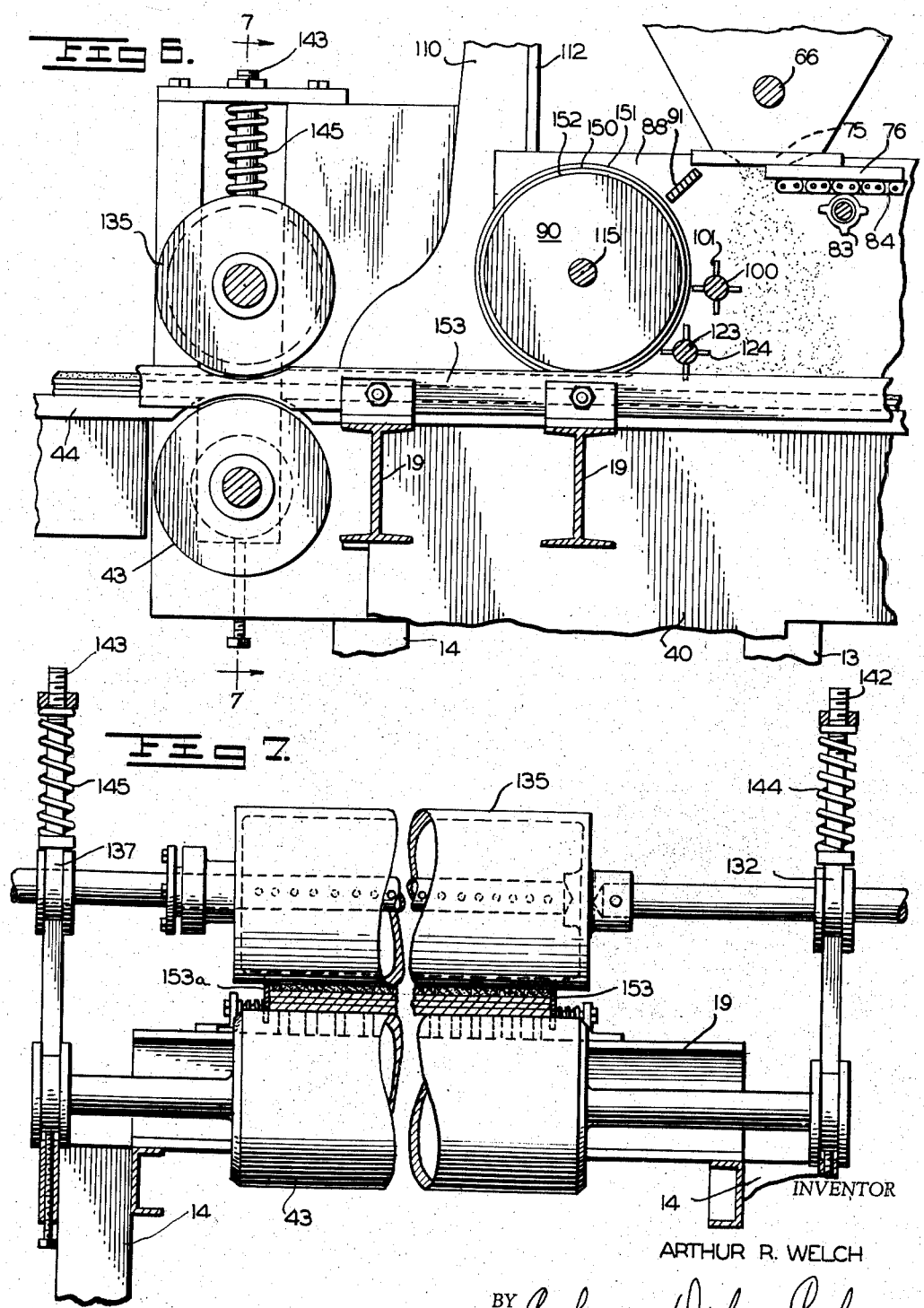

United States Patent Office 2,847,701
Patented Aug. 19, 1958

2,847,701

APPARATUS FOR DEPOSITING OVERLAY MATERIAL ON PLYWOOD PANELS

Arthur R. Welch, Hoquiam, Wash.

Application May 9, 1952, Serial No. 287,001

10 Claims. (Cl. 18—4)

The present invention relates to an apparatus for applying to a sheet, plate, or slab of large surface area, a smooth, even layer of relatively light, dry and fluffy pulverant material of accurately controlled, substantially uniform density and thickness.

A primary object of the invention is to provide an improved apparatus, adapted for mass production and continuous operation, for use in the manufacture of plywood having an overlay thereon, or other wood sheets or slabs having an overlay thereon, or in the manufacture of artificial lumber.

Another object of the invention is to provide an apparatus for making an improved bond between the plywood panel or other wood sheet or slab and the layer of overlay material.

Another object is to provide improved means for depositing on the base panel, sheet, or slab, a layer of pulverant material, adapted to form an overlay in subsequent operations, of accurately controlled and uniform density, and of accurately controlled, through variable thickness, having a smooth upper surface from edge to edge of the base panel, sheet, or slab.

A further object of the invention is to provide an apparatus which will impart to such a layer of overlay material, a preliminary compression step or steps, to the end that the pulverant material may be sufficiently compacted and compressed, by a continuous operation, to prevent inadvertent disturbance or dislodgment of the material during subsequent handling of the panels, for instance when the panels are being transported to and loaded into a multiple opening hot press, for the final heating and pressing of the overlay.

Another object of the invention is to provide improved means for handling the relatively dry, light, fluffy, pulverant, overlay material prior to and during the deposition thereof onto the base panels, sheets, or slabs, to prevent packing, crowding, balling, or jamming of the material and clogging of the apparatus or an uneven distribution of the material on the panels.

Another object is to provide means for depositing on the panels, a slight excess of the overlay material along the lateral edges of the panels, to compensate for lateral displacement during the preliminary compression step, and to assure an adequate supply of the material along those edges during and after the final heating and pressing operation in the multiple opening hot press.

Another object of the invention is to provide improved means for conveying a plurality of plywood panels or the like in end to end relation along a predetermined line through the machine, and to provide, in combination with the conveying means, improved means for maintaining the panels in a flat, even, planar relation and to eliminate waves, humps, or hollows therein, to the end that the panels have substantially smooth, planar upper surfaces for the reception of the layer of overlay material.

Other and further objects and advantages of the invention will be apparent from a consideration of the following description of the specific embodiment, shown for purposes of illustration in the accompanying drawings, in which Figure 1 is a side elevation of the apparatus, with the infeed and delivery tables broken away;

Figure 3 is a side elevation of a portion of the machine shown in Figure 1, looking in the opposite direction;

Figure 4 is a transverse section and elevation, taken from the right-hand end of Figure 1, looking toward the left and showing the infeed or head end of the machine;

Figure 5 is a fragmentary section and elevation on line 5—5 of Figure 2, showing the smoothing roll and associated parts;

Figure 1:
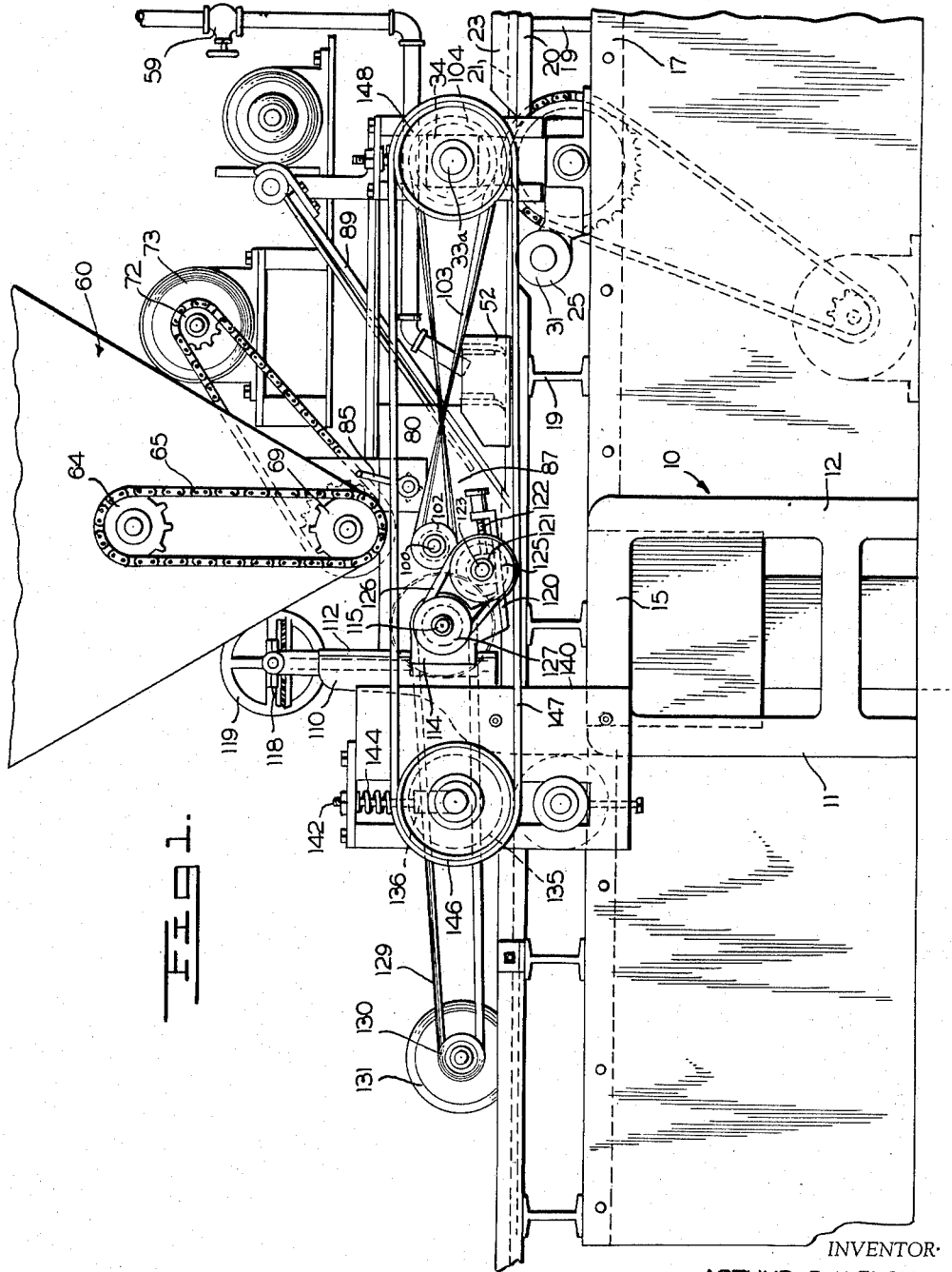

Figure 6 is a vertical sectional view, of a portion of Figure 1 on an enlarged scale, partly in elevation, on a plane behind the belts and pulleys in Figure 1, with the near side wall of the material-depositing chamber removed; and Figure 7 is a transverse vertical section and elevation, with parts broken away, showing the compression roll and the backing-up roll at the discharge end of the machine.

The apparatus of the present invention is particularly adapted for use in the manufacture of products of the type shown and described in my prior Patent No. 2,419,614, dated April 29, 1947. The present invention constitutes improvements upon and modifications of the apparatus shown in my prior applications, Serial No. 548,774, filed August 9, 1944, now Patent 2,601,349 and Serial No. 707,767, filed November 4, 1946, now Patent 2,606,138.

The machine may comprise a heavy central, table-like frame indicated generally at 10 and including vertical legs 11 and 12, on the near side (Figure 1), similar legs 13 and 14 on the other side (Figure 3), and horizontal upper members 15 and 16. Projecting in opposite directions from the central table are longitudinal frame members 17 and 18, supported in any suitable manner and carrying transverse frame members 19, in suitable spaced relation.

Figure 2:
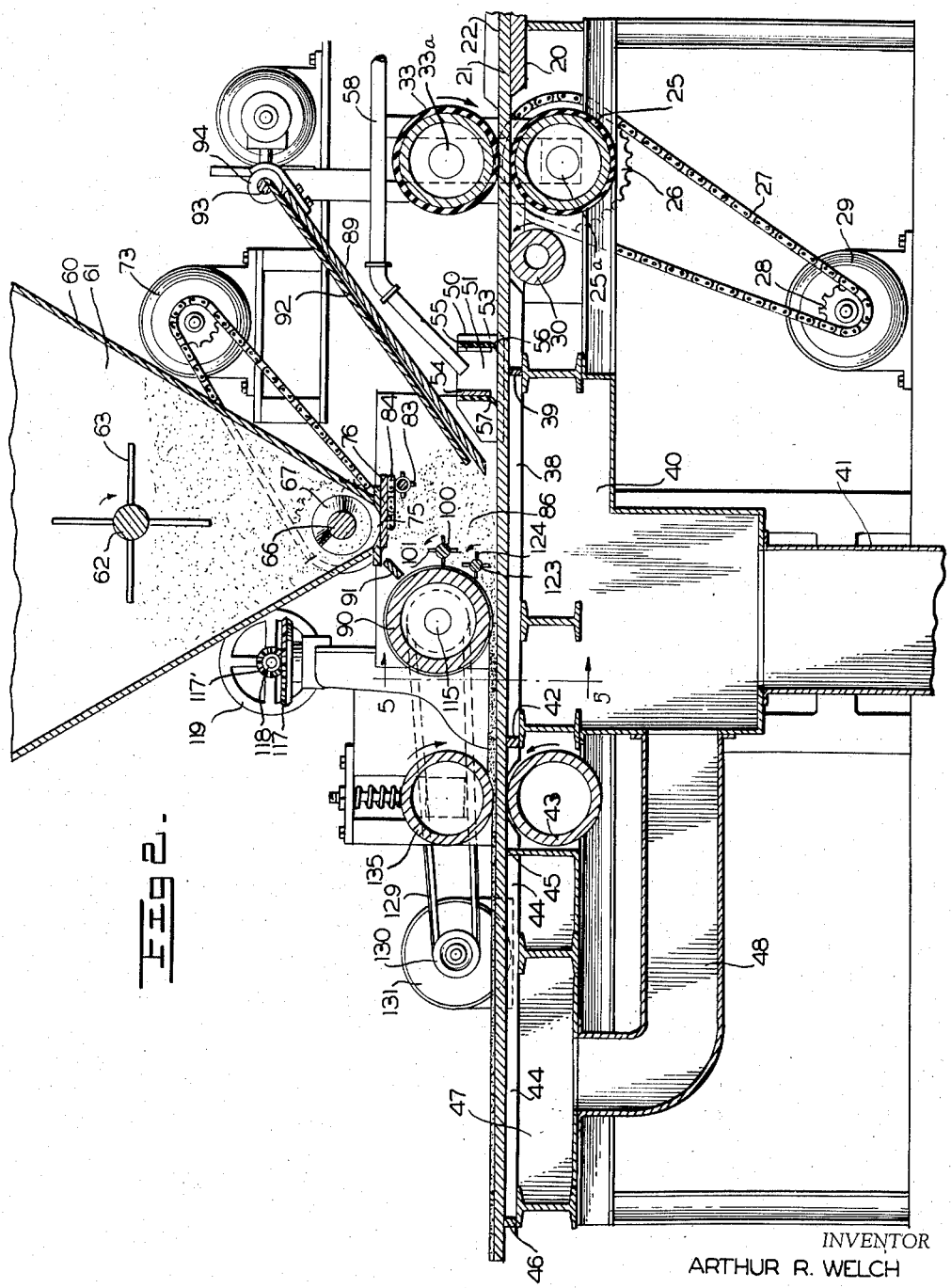
Figure 2 is a vertical, central, longitudinal section, looking in the same direction as Figure 1.

Extending to the right a substantial distance beyond the portion of the machine shown in Figures 1 and 2 is a horizontal bed or infeed table 20, supported by one or more of the transverse frame members 19, or in any other suitable manner. The bed or table is preferably made up of a plurality of fixed, stationary plywood panels over which the panels 21 to be coated may slide with ease, as they are placed thereon in end-to-end abutting relation, lined up by the operators, and fed into the machine. As indicated in Figures 1, 2 and 4, the far edge of the bed or table 20 supports a fixed angle guide 22 against which the panels may be pushed by the operators to bring them into alignment. On the near side, a similar guide 23 is provided to maintain the panels in alignment, as they are fed into the feed rolls hereinafter described.

Journalled in appropriate bearings carried by the main frame is a lower, rubber covered feed roll 25, having its periphery projecting slightly above the upper surface of the bed 20, immediately adjacent the rear edge thereof. The roll shaft 25a carries a sprocket 26 on its far end (Figures 2, 3 and 4) about which there is trained a chain 27, driven by a similar sprocket 28, associated with a speed reducer and electric motor 29. Immediately behind the lower feed roll 25 is an idler roll 30, serving as a support for the panels 21, and journalled in bearings 31 and 32, which may be supported by the bearing blocks for the roll shaft 25a or in any other approved manner.

Above the lower feed roll 25 is a downwardly springpressed, upper, rubber covered idler feed roll 33, having its shaft 33a journalled in vertically slidable bearings 34 and 35, urged downwardly by a pair of springs, one of which is shown at 36 in Figure 3. Thus, the panels are fed into the bite between the rolls 25 and 33 and are pushed thereby through the machine, for purposes hereinafter described.

Behind the idler roll 30 are a plurality of longitudinally extending, spaced, parallel bars or strips 38, constituting a support for the panels after they leave the idler roll 30. Adjacent their forward ends, the spaces between the bars may be filled or blocked off by transverse blocks or strips 39, to provide an air seal. To the rear of the seal thus provided, the spaces between the bars or strips 38 communicate with a suction box 40 having a connection through a conduit 41 with an exhaust fan, not shown. The spaces between the bars adjacent their rear ends may be similarly closed and sealed by blocks indicated at 42 (Figure 2).

The bars 38 terminate at their rear ends adjacent a lower, backing up roller 43, hereinafter described. Similar, longitudinally extending, parallel bars 44 extend rearwardly from the roll 43, to the rear, discharge end of the machine. At their forward ends, the spaces between these bars are sealed, by blocks 45, and, at their rear ends, by blocks 46.

The space between the parallel bars 44 communicates with a suction box 47 which is connected by a conduit 48 to the above-mentioned suction box 40.

Hence, as the panels are fed through the machine, they are forced downwardly into firm contact with the bars 38 and 44, by the difference in air pressure between external atmosphere and the reduced pressure in the suction boxes 40 and 47, so that they are maintained in a flat, even, level, non-wavy condition.

Disposed transversely of the machine, behind the feed rollers 25 and 33 and the idler roller 30 and in spaced relation above the supporting bars 38, is an adhesive applicator mechanism represented generally at 50. The applicator and associated parts may be similar to the structure shown in United States Patent No. 2,354,777, and reference is made thereto for the details of construction of a suitable apparatus. Preferably, the adhesive applicator takes the form of an open bottom trough 51, having end plates 52 and 53, urged inwardly to engage the side edges of the panel, and transverse walls 54 and 55, carrying rubber squeegees 56 and 57, having their lower edges in wiping relation to the upper surfaces of the panels fed through the machine. Adhesive, such as an aqueous, heat setting, synthetic resin solution may be fed to the trough by a pipe 58 having a valve 59 therein under the control of the operator, so that the adhesive may be maintained at the desired predetermined level in the trough 51.

Thus, as the panels pass beneath the adhesive applicator, they receive a uniform coating of adhesive upon their upper surfaces.

The pool of adhesive in the trough penetrates the minute fissures and cracks on the surface of the plywood panel and effectively fills them, while the excess is wiped off by the squeegee 57, so that only a thin surface layer of the resin solution remains on the surface, but the surface is sufficiently coated and penetrated by the adhesive to form an excellent bond with the subsequently applied overlay material. The resin applied by the applicator is compatible with and preferably of the same type as is used for the binder in the overlay.

Above the central table or frame 10 and the panel-supporting bars 38 is a large hopper 60, adapted to receive and to contain a supply of the overlay material, indicated generally at 61, which may consist of a mixture of discrete wood particles, such as sanderdust or sawdust or mixtures of the two, and an aqueous, heat-setting, synthetic resin solution, of the type referred to in my aforementioned applications for patent. The overlay material is relatively dry, light, and fluffy, but contains sufficient resin so that, when compacted in the hand, it retains the form imparted thereto and is a substantially self-sustaining mass. Hence, it is important to prevent the material from becoming compacted in the machine and to maintain it in the light, fluffy, free-flowing condition, so that it may be applied to the panels in a layer of the desired uniform thickness and of uniform density throughout the layer. To this end, there is provided, in the hopper, a first agitating mechanism, comprising a transverse shaft 62, journalled in appropriate bearings carried by the vertical side walls of the hopper. The shaft 62 has a plurality of radially extending arms or bars 63, spaced suitably along the length thereof. The shaft extends through the wall of the hopper on the near side, as indicated in Figure 1, where it carries a sprocket wheel 64 about which is trained a chain 65, so that rotary motion is imparted to the shaft as hereinafter explained.

Adjacent the lower end of the hopper 60 is a second agitator shaft 66 having two continuous, oppositely pitched spiral blades 67 and 68 mounted thereon, tending to feed the material in opposite directions, with a sort of churning action, and to keep the material evenly distributed in the bottom of the hopper and to prevent compacting thereof. This shaft 66 also extends through the vertical wall of the hopper, on the near side, as shown in Figure 1, where it carries a sprocket 69, about which the chain 65 is trained. Its opposite end extends through the vertical wall of the chute on the far side of the machine, as shown in Figure 3, where it carries a second sprocket 70, about which is trained a chain 71, connected to a sprocket 72, associated with an electric motor and speed reducer 73. Hence, rotary motion is transmitted from the sprocket 72 through chain 71 to sprocket 70, shaft 66 and sprocket 69, to sprocket 64 and the upper shaft 62 through chain 65.

Below the mouth 75 of the hopper 60 is a horizontally slidable shutter 76, supported in slideways carried by the side plates of the material depositing chamber hereinafter described. By shifting the horizontal position of the shutter, the effective size of the discharge opening or mouth of the hopper may be varied.

A pair of plate-like brackets 80 and 81, depending from the hopper 60 at opposite sides thereof support a transverse shutter-controlling shaft 82, having small sprockets 83 adjacent its opposite ends, in engagement with short chain sections 84, secured to the lower surface of the shutter at opposite ends thereof. Hence, when the shaft is rotated by the hand lever 85 (Figure 1) the shutter is moved back and forth.

The overlay depositing chamber, indicated generally at 86 in Figure 2 is defined by side plates 87 and 88, an inclined panel 89 and a rear, smoothing roll 90, having a fixed baffle strip 91 thereabove. Disposed above the inclined panel 89, there is mounted a horizontally reciprocating distributing board 92, carried by a transverse horizontally reciprocating shaft 93 supported in fixed bearings 94, carried by the upper end of the panel 89. As best shown in Figure 4, the shaft 93 is extended laterally on the far side of the machine, where it is connected by a pitman 95 to a crank pin 96, mounted on a disk 97, driven by an independent electric motor 98 and a speed reducer 99. Thus, the distributing board 92 is reciprocated back and forth on the panel 89, to assist in maintaining an even distribution of the aggregate material at the lower end thereof, transversely of the machine.

Suitably journalled in the side plates of the overlay distributing and depositing chamber is a third agitator shaft 100, having a plurality of pins or fingers 101 projecting radially therefrom, in suitably spaced and staggered relation. The pins have their ends arranged in closely spaced relation to, but clearing the surface of, the smoothing roll 90, hereinafter described. The shaft 100 extends through the near side plate 87, where it carries a pulley 102, about which is trained a belt 103, having its two runs disposed in crossed relation and trained at its other end about a pulley 104, fast upon the near end of the shaft upon which the upper feed roll 33 is mounted. Thus, the shaft 100 is rotated in the opposite direction from the feed roll 33 or, as viewed in Figures 1 and 2, in a counterclockwise direction. The relative size of the pulleys 104 and 102, as illustrated in Figure 1, is such that the shaft 100 rotates at a higher rate than the upper feed roll 33, driven by frictional contact with the panels being fed through the machine.

The shaft 100 with the pins 101 thereon serve to agitate the relatively dry, light, fluffy overlay material in the chamber 86, prevent packing thereof, and tend to maintain the periphery of the smoothing roll 90 clear, and to prevent packing of the material against the baffle or closure plate 91.

Projecting upwardly from the central frame or base 10 are a pair of columns 110 and 111 having associated with their front faces, vertical ways 112 and 113, upon which are slidably mounted for vertical adjustment, bearing blocks 114 for the shaft 115 of the smoothing roll 90. The vertical position of the bearing blocks 114 may be controlled (Figures 2 and 4) by vertically disposed screws 116, journalled in bearings associated with the arms 110 and 111, and having bevel gears 117 at their upper ends, in mesh with relatively small bevel gears 117', fast on a transverse shaft 118 having a hand wheel 119 on the end thereof at the far side of the machine (Figures 1–3). Thus, the screws 116 may be rotated in unison and the bearing blocks 114 for opposite ends of the smoothing roll shaft 115 raised and lowered in unison, to control the elevation of the smoothing roll.

The bearing blocks 114, as shown in Figures 1 and 3, carry brackets 120, upon which bearings 121 are mounted for substantially horizontal adjustment, by screws 122. These bearings support a shaft 123, having a plurality of projections or fingers 124 projecting radially therefrom and disposed in advance of the smoothing roll 90, substantially in the bite between the periphery of that roll and the moving panel 21. The extension of the shaft 123 on the near side of the machine (Figure 1) carries a pulley 125, about which there is trained a short belt 126, also trained about a pulley 127, fast on the near end of the smoothing roll shaft 115. The opposite end of the latter shaft carries a pulley 128 (Figure 3), connected through a belt 129 to a pulley 130, driven by an independent electric motor 131. Hence, the smoothing roll 90 and the fourth agitator shaft 123 are rotated rapidly in a counterclockwise direction as viewed in Figures 1 and 2.

Behind the smoothing roll 90 and in vertical alignment with the backing-up roll 43 is a steam-heated preliminary compression roll 135, having a hollow interior and axially projecting journals, mounted in vertically slidable bearing blocks 136 and 137. These blocks are mounted in vertical ways 138 and 139, formed in extensions 140, 141, secured to the upstanding columns 110 and 111 of the central frame 10. The blocks are carried by vertically disposed screw threaded shafts 142 and 143, having springs 144, 145, urging the blocks downwardly to a limit controlled by nuts on the upper ends of the shafts. Thus, the normal position of the preliminary compression roll 135, above the surface of the plywood panels may be varied, depending upon the thickness of the layer of overlay applied thereto and the degree of preliminary compression desired.

Steam under pressure may be delivered to the hollow interior of the preliminary compression roll 135, and condensate removed therefrom, through one or both of the hollow journals, by conventional means, well understood in the steam heated drying drum art. Preferably, the steam pressure in the interior of the roll 135 is maintained in the neighborhood of 60 pounds per square inch, to the end that the overlay material may be preliminarily heated and compressed, and the resin content thereof partially polymerized, to prevent inadvertent disturbance of the overlay, during the subsequent handling of the panels, and, more particularly, while they are being transported to the hot press loader, placed therein, and transferred from the loader to the multiple opening hot press.

On the near side of the machine, as shown in Figure 1, a pulley 146 is secured to the journal extension of the roll 135, or otherwise made fast with respect to the roll. An endless belt 147 trained about the pulley 146 extends forwardly toward the head end of the machine, where it is trained about another pulley 148 of the same diameter, fast on the shaft extension 33a for the upper, idler feed roll 33. The latter roll is driven by contact with the upper surface of the panels at the same peripheral speed as the speed of movement of the panels. Through the pulley 148, belt 147 and pulley 146, the steam heated preliminary compression roll 145 is, therefore, positively driven at the same speed, so that its surface makes rolling contact with the layer of overlay material on the panels and compresses the material, without drag or frictional disturbance thereof.

The distributing and smoothing roll 90, referred to above is of specifically novel construction, shown in an exaggerated manner in Figure 5. The surface of the roll is provided with a great plurality of independent parallel, adjacent, circumferential ribs and grooves 150, 151, which enables the roll to have an improved frictional contact with the overlay material, to throw the excess material rearwardly, without packing the same on the panels and without clogging of the grooves. Adjacent its ends, the roll diameter is reduced, as indicated at 152, for a short distance, such as an inch or two. This reduction in the roll diameter provides a slight excess in the thickness of the overlay material along the edges of the panel, so that there is sufficient material along these edges to prevent dislodgment thereof, or an inadequate supply or "starving" along the edges.

As indicated in Figures 5, 6 and 7, inwardly spring pressed, vertically disposed side plates or strips 153 and 153a may extend along the sides of the overlay depositing chamber, to the smoothing roll 90 and beyond, to prevent lateral discharge of the overlay material. These strips may extend all the way to and slightly beyond the preliminary compression roll 135, to confine the material against lateral spreading during the preliminary compression step. The strips may have arcuate recesses in their upper edges, as indicated in Figures 6 and 7, substantially in running contact with the periphery of the roll 135.

It is thought that the operation of the apparatus of the present invention will be apparent from the foregoing description. Plywood panels or other wood sheets or slabs are placed successively upon the feed table 20 and are fed through the machine in end-to-end abutting relation, by the feed rolls 25 and 33. As the panels pass below the adhesive applicator 50, they receive a coating of a suitable adhesive, such as an aqueous solution of a heat setting synthetic resin. The panels then pass through the overlay depositing chamber 86, where they receive a layer of a light, fluffy mixture of pulverant material, such as a mixture of heat setting synthetic resin and discrete wood particles. The thickness of the layer so deposited is accurately controlled by the smoothing roll 90, rotating rapidly in the opposite direction from the movement of the panels. The material is distributed and prevented from clogging by the agitating devices referred to above, to the end that a layer of uniform density is applied. The panels, with the accurately controlled layer of overlay material, pass between the rolls 43 and 135, where the material is preliminarily compressed and heated. They are then fed forwardly onto the delivery table, where they are removed, one by one, by the operators and placed in the press loader, for subsequent transfer to the multiple opening hot press, where they are given the final heating and pressing treatment, and the polymerization of the resin is completed.

If it is desired to make artificial lumber, consisting of slabs of a mixture of discrete wood particles and synthetic resin, metal caul plates or the equivalent may be substituted for the plywood panels and fed through the machine in the same manner, to receive a layer of substantial thickness of the material. Upper caul plates, if desired, may be deposited on the preliminarily compressed material, or a plurality of assemblies, each consisting of a single plate and a layer of the mixture, may be loaded into the hot press, in place of the plywood panels. If desired, a stack of plates and intermediate layers of the synthetic resin-wood mixture may be built up, as suggested in my application Serial No. 548,774, referred to above. After final compression, the metal plates may be stripped from the slabs.

It must be understood that the invention is not limited to the details of construction described above and shown for purposes of illustration in the accompanying drawings, but includes all modifications coming within the scope of the appended claims and their equivalents.

I claim:

1. An apparatus for coating panels with a layer of substantial thickness of a relatively dry, light, fluffy mixture of discrete wood particles and a heat setting synthetic resin, comprising means for conveying a line of panels in end-to-end abutment, means for maintaining above and in contact with the upper surface of the moving line, a transversely extending mass of said mixture of excess thickness, means for continuously agitating the mixture in said mass and for evenly distributing the same to prevent compacting and to maintain the density thereof substantially constant, a rapidly reversely rotating roll directly adjacent to said agitating means, said roll having a plurality of narrow, closely spaced circumferential grooves on its periphery above the moving line of panels for removing the excess of said mixture, to leave thereon a smooth layer of predetermined thickness, and for returning said excess directly to said mass, and means for momentarily compressing said smooth layer on the upper surface of the moving panels to compact the mixture sufficiently to prevent inadvertent disturbance of the layer during subsequent handling of the panels.

2. An apparatus for coating plywood panels with a layer of substantial thickness of a mixture of discrete wood particles and a heat-setting synthetic resin, comprising means disposed in a single plane for supporting a line of panels in a substantially horizontal plane, means for conveying the panels along said supporting means in end-to-end abutment, suction means effective through the supporting means to maintain the panels in flat, planar condition thereon, means above the upper surface of the line of panels for applying a coating of adhesive thereto, means for supplying and maintaining upon said upper surface a transversely extending mass of excess thickness of said mixture, a reversely rotating smoothing roll above said line for removing the excess of the mixture therefrom as the panels move therebelow and for returning the excess to the mass, to leave a layer on the panels of predetermined thickness, means for continuously agitating the mixture in the mass, and means for heating and momentarily compressing the layer on the moving line of panels, to compact and to set the layer sufficiently to prevent its inadvertent disturbance during subsequent handling of the panels.

3. An apparatus in accordance with claim 2, in which the reversely rotating roll is of slightly reduced diameter adjacent its ends, to provide an excess thickness of the layer adjacent the edges of the panels.

4. An apparatus for coating panels with a layer of substantial thickness of a mixture of discrete wood particles and a heat-setting synthetic resin, comprising means for supporting a line of panels for movement along a horizontal path in end-abutting relation, a lower, positively driven infeed roll below said supporting means and engaging the lower surfaces of the panels, an upper, idler infeed roll engaging the upper surfaces of the panels and driven thereby, means for applying a smooth, uniform layer of said mixture to the upper surfaces of the panels, a heated compression roll above the panels, for compressing the layer, an idler roll below and in vertical alignment with the last mentioned roll and engaging the lower surfaces of the panels, and means transmitting rotation from the upper, idler infeed roll to the compression roll at the same peripheral speed.

5. An apparatus for coating panels with a layer of substantial thickness of a mixture of discrete wood particles and a heat-setting synthetic resin, comprising means for supporting a line of panels for movement along a horizontal path in end-abutting relation, a lower, positively driven infeed roll below said supporting means and engaging the lower surfaces of the panels, an upper, idler infeed roll engaging the upper surfaces of the panels and driven thereby, means for applying a smooth, uniform layer of said mixture to the upper surfaces of the panels, a heated compression roll above the panels, for compressing the layer, an idler roll below the last mentioned roll engaging the lower surfaces of the panels, said compression roll being of the same diameter as the upper, idler infeed roll, pulleys of the same diameter connected for rotation with the infeed idler roll and the compression roll, and a belt trained about said pulleys, whereby the compression roll is driven at the same peripheral speed as the infeed roll and the panels.

6. Means for depositing upon a horizontally moving line of end-abutting plywood panels, a layer of accurately controlled thickness of a light, dry, fluffy mixture of discrete wood particles and a heat setting synthetic resin, comprising a feed hopper, means therein for agitating the mixture and for preventing compacting thereof, a discharge opening at the lower end of the hopper, a gate for varying the effective size of the discharge opening, a depositing chamber below the hopper, defined by side walls engaging the side edges of the panels, a rearwardly and downwardly inclined front wall and a smoothing roll at the rear, panel-discharge end, a horizontally reciprocating material distributor associated with the upper surface of said inclined wall, means for agitating the material in the chamber above the panels, and means for rotating the smoothing roll rearwardly with respect to the direction of movement of the panels, to remove the excess material therefrom as they pass therebelow and to maintain said excess in the chamber.

7. Apparatus in accordance with claim 6, including means below the material depositing chamber for supporting the moving line of panels and for subjecting the undersurfaces of the panels to suction, to maintain them in the flat, planar relation during the depositing and smoothing operations.

8. An apparatus in accordance with claim 6, in which the means for agitating the material in the depositing chamber comprises upper and lower shafts, having projections thereon, positioned immediately adjacent the smoothing roll.

9. An apparatus for coating plywood panels with a layer of substantial thickness of a mixture of overlay-forming material, comprising a horizontal support, means for conveying a line of panels in end-to-end abutting relation over said support, suction means below and effective through the support to hold the panels flatwise, in planar relation thereon, means above the suction means for depositing on the line an accurately controlled layer of uniform thickness of said material, and means spaced behind the last-mentioned means in the direction of panel movement and above the suction means for momentarily compressing the layer of material.

10. An apparatus for coating plywood panels with a layer of substantial thickness of a mixture of overlay-forming material, comprising a horizontal support, upper and lower infeed rolls for pushing a line of panels in end-to-end abutting relation over said support, means for positively driving one of said infeed rolls, the other being an idler roll driven by contact with the panels, means for depositing an accurately controlled, uniform layer of overlay forming material on the upper surface of the line of panels, a compression roll behind the depositing means in the direction of movement of the line, above the panels for compressing the material on the panels, and means for transmitting rotation from the idler infeed roll to the compresison roll at the same peripheral speed, whereby the compression roll makes rolling contact with the material at the same speed of movement.

References Cited in the file of this patent

UNITED STATES PATENTS

| | | | |
|---|---|---|---|
| 832,441 | Anderson | Oct. 2, | 1906 |
| 1,076,765 | Hoffman | Oct. 28, | 1913 |
| 1,297,773 | Adams | May 18, | 1919 |
| 1,342,192 | Trevillian | June 1, | 1920 |
| 1,742,410 | Millington | Jan. 7, | 1930 |
| 1,960,399 | Taylor | May 29, | 1934 |
| 1,970,742 | Gerard et al. | Aug. 21, | 1934 |
| 2,230,880 | Brown | Feb. 4, | 1941 |
| 2,255,294 | Melton | Sept. 9, | 1941 |
| 2,377,484 | Elmendorf | June 5, | 1945 |
| 2,404,454 | Owens | July 23, | 1946 |
| 2,444,918 | Cone | July 13, | 1948 |
| 2,446,644 | Fischer | Aug. 10, | 1948 |
| 2,524,737 | Sawyer | Oct. 3, | 1950 |
| 2,553,481 | Sharples | May 15, | 1951 |
| 2,577,205 | Meyer et al. | Dec. 4, | 1951 |
| 2,580,200 | Shrimpton | Dec. 25, | 1951 |
| 2,592,470 | Ryberg | Apr. 8, | 1952 |
| 2,592,521 | Thompson | Apr. 8, | 1952 |
| 2,601,349 | Welch | June 24, | 1952 |
| 2,635,301 | Schubert et al. | Apr. 21, | 1953 |
| 2,655,458 | Collins | Oct. 13, | 1953 |
| 2,693,619 | Gross | Nov. 9, | 1954 |

FOREIGN PATENTS

| | | | |
|---|---|---|---|
| 611,148 | France | Sept. 21, | 1926 |
| 432,091 | Germany | July 28, | 1926 |